Figure 1:
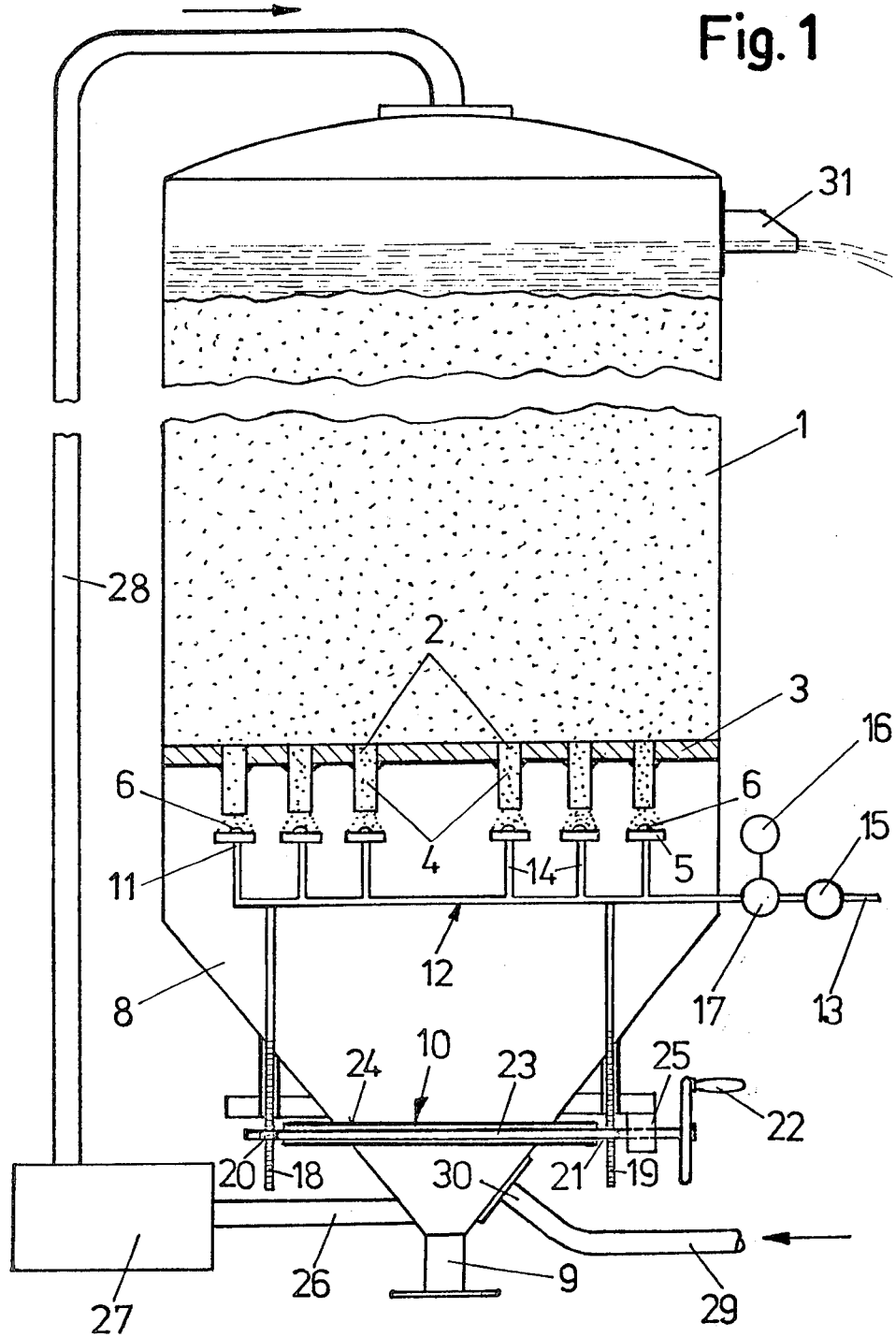

United States Patent [19]

Friese

[11] 4,071,452
[45] Jan. 31, 1978

[54] DEVICE FOR DISCHARGING PARTICULATE MATERIALS

[75] Inventor: Günther Friese, Zurich, Switzerland

[73] Assignee: Swiss Aluminium Ltd., Chippis, Switzerland

[21] Appl. No.: 688,612

[22] Filed: May 21, 1976

[30] Foreign Application Priority Data

May 28, 1975 Switzerland .................... 6817/75

[51] Int. Cl.² ........................................... B01D 41/02
[52] U.S. Cl. .................................. 210/189; 210/269;
222/193; 222/482; 222/544; 302/52
[58] Field of Search ................. 222/193, 482, 544;
302/52; 210/189, 269

[56] References Cited

U.S. PATENT DOCUMENTS

| 2,552,435 | 5/1951 | Knox et al. ............... 210/189 X |
| 2,590,148 | 3/1952 | Berg ............................. 210/189 X |
| 2,684,869 | 7/1954 | Lappie ......................... 302/51 X |
| 3,878,096 | 4/1975 | Somogye ..................... 210/189 X |

*Primary Examiner*—Stanley H. Tollberg
*Assistant Examiner*—Frederick R. Handren
*Attorney, Agent, or Firm*—Ernest F. Marmorek

[57] ABSTRACT

A device for discharging particulate materials, especially when wet and in specific quantities, allows uniform discharging across the cross section of a container through a number of ports in the floor of the container. A device underneath and at a distance from the ports is such that it exhibits plates having nozzles connected to an air or liquid supply under pressure and the application of the said device allows control of the formation of a cone of material whereby the discharging process can be easily controlled and stopped as desired.

7 Claims, 2 Drawing Figures

U.S. Patent  Jan. 31, 1978  Sheet 1 of 2  4,071,452

DEVICE FOR DISCHARGING PARTICULATE MATERIALS

The invention concerns a device for discharging particulate materials in particular for discharging wet materials of this kind in specific quantities out of a plurality openings at various positions in the floor of a container and concerns too a device provided near the said openings, wich is for moving further the material which has run out of the openings.

Devices which are already known and are for discharging particulate materials are normally positioned under a container and exhibit a plate which is made to rotate, and have a device or scraper for removing the heaped material from the plate, for example, to transfer it to a conveyor belt.

Known too, is the provision of uniformly distributed valves or sliding ports in the floor of a container, through which the particulate material can be removed in specified amounts.

The known devices for discharging materials have the disadvantages that if they are to discharge relatively large amounts uniformly and in specific quantities, they are very expensive and susceptible to failure, and also in most cases are not suitable for discharging wet particulate material. The discharging of material, especially wet particulate material, uniformly from the whole cross section of containers of large diameter, frequently encounters considerable difficulties, which amongst other things can arise through the adhesion of the contents to the container wall and through the formation of the well known cone in the charge which can arise with a central outlet.

Granular particulate material also usually has an abrading effect when moved, so that the mechanically operated discharging device is subjected to a particularly high degree of abrasion on discharging such a material.

The object of the invention presented here is then to provide a device for discharging particulate material, with which device the disadvantages associated with the known devices for discharging such materials are avoided and also allows a wider range of application for the device than has been possible with those devices available up to now.

This objective is fulfilled by way of the invention in that positioned under openings in the container floor and at a distance from it, there are provided plates which have, on the upper side facing the openings, nozzles which are connected to a supply of gas or liquid which is under pressure.

Figure 2:
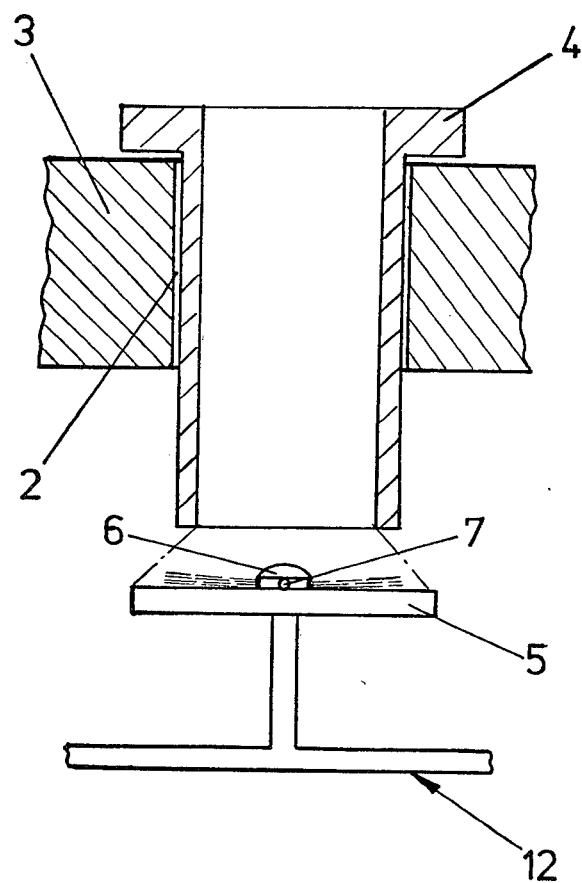

The accompanying drawing shows exemplified embodiments of the invention in simplified schematic representation viz., FIG. 1 A cross section through a discharging device positioned at the bottom of a container FIG. 2 A section through a discharging port of the discharging device, with facilities for checking and controlling the quantity of material discharged.

FIG. 1 shows a container 1 for particulate material which is loaded for example with a charge of wet, solid particulate material. In the lower part of the container 1 in the floor 3 ports 2 have been provided. The ports 2 have outlet pipes 4 fitted to them. Below these pipes 4 there are provided plates 5 which can be moved towards or away from the outlet pipes 4, and which are of larger diameter than the internal diameter of the port 2 or outlet pipes 4. In the centre of the upper face of the plate 5 there is a nozzle 6 with a plurality of openings 7 out of which water or a gas is expelled in a jet under pressure at high speed and either radially or sideways during discharging from the container. Pertinent but not shown here is that the ports 2 and the accompanying plates 5 with the nozzles 6 are positioned such that they are uniformly spaced out over the surface of the floor 3 of the container 1.

Below the floor 3 of the container is a chamber 8 which is preferably funnel shaped and in which the discharged material is collected and withdrawn via an outlet valve 9 according to requirements. On the wall of the chamber 8 there is a raising and lowering device 10 with which the plates are directly connected. In accordance with the exemplified embodiment shown here there is provided one plate 5 at the end of each tube 11 of a pipeline system 12 through which water or gas is passed under pressure. The plates 5 exhibit, in a manner not shown here, holes into which the nozzles 6, which project out beyond the surface of the plate, are inserted and connected to the ends of the pipes 11. In order that the supply of water or air to the nozzles 6 can be regulated, a reduction valve 15 is provided on the main supply line 13 of the pipeline system and also a valve 17 with a switch 16 for controlling the opening and closing the supply along pipe 13 at chosen time intervals and which functions either automatically or is operated by hand.

The pipeline system 12, which consists of a main supply line 13 and distributory lines 14, is connected directly to the raising and lowering device 10 which incorporates two cog racks 18 and 19 running vertically. The racks 18, 19 engage in the cogged wheels 20 and 21 of a shaft 23 which can be turned by means of a cranking handle 22, the shaft 23 being housed in the pipe 24 which is fixed to the wall of the chamber 8. In order that the raising and lowering device 10 can be fixed at any particular height there is provided on the outer wall of the chamber 8 a stopping device 25 with which the shaft 23 can be arrested at any desirable setting of the raising and lowering device. In one application, the charge material such as an adsorption agent is fed into the chamber 8 in specific amounts, to a regenerator 28 via a pipeline 26 and then back to the container 1. The adsorption agent, such as active alumina adsorbent for example, is used to scrub gases or purify liquids by allowing these media to flow in a known manner through the adsorption agent which is usually granular in form. For this purpose a pipe 29 which exhibits at least one exit 30 inside the chamber 8, passes through the wall of the funnel shaped chamber 8. The dirty liquid or gaseous medium is led through this exit 30 to the adsorbent in the container 1 via the ports 2 and the ipes 4 and then after cleaning there led off via the outlet 31 in the upper part of the container 1 for further use.

The manner in which the discharging device functions is as follows:

In order to discharge in specific amounts the usually wet particulate material, it is now necessary only to alter the cone of material which forms on the plate 5, and which produces a seal with the ports, and this by using jets of liquid or gas in such a way that they produce either only incomplete or no sealing effect at the ports 2. The discharging of the particulate material through the ports 2 lasts, in other words, until the jet is interrupted and the material is able to build up a cone with a cone angle characteristic of that material and thus seals the port 2 by itself.

In order to be able to allow for the various heights of cone formed by various materials, it is necessary to be able to adjust the distance between the port 2 and the plate 5, so that if for any reason the jetting through the nozzles 6 should fail, the desired sealing effect at the ports 2 would still occur. The adjustment to produce the desired distance can be achieved by means of the cranking handle 22.

The material which is discharged uniformly from the whole of the surface area at the bottom of the container falls into the chamber 8 and can be removed from there, according to requirements, via the port 9 which can be opened and closed.

In order to regulate the amount discharged, either the reduction valve 15 or an electro-magnetic valve 17 connected to a switch or timer 16 for opening or closing the main supply line can be operated.

The discharging device is also suitable, in a particularly advantageous manner, for scrubbing gases or purifying waste waters in that the container 1 having the discharging device fitted in the floor 3 can simultaneously be used for containing the medium to be cleaned. The liquid or gaseous medium which is to be cleaned is led in a so-called counter flow manner from the bottom to the top of chamber 8, through the spaces between the plates 5 and the ports 2 into the container and through the charge adsorption agent in the container to be cleaned there, flowing upwards to the top and to the outlet 31, while the adsorption agent is led from the top downwards under the force of gravity and by opening the ports 2 which are spaced out uniformly over the cross section of the container 1 — through the container, the ports 2, the chamber 8 and via the pipe 26 to the regenerator 27. It should be mentioned in connection with this that there are for example adsorbents which in a known cleaning process using active alumina, exhibit a very high capacity for adsorption and can by regeneration be used at least thirty times.

With the help of the discharging device it has now become possible, amongst other things, not only to discharge wet particulate material uniformly from the whole surface area at the bottom of a container but at the same time to use this discharging device as a component of a purification unit for treating gaseous or liquid media. The device for discharging relatively large quantities of particulate material is simple in construction, very reliable in operation and has a very long working life.

What I claim is:

1. A device for controlling the discharging of particulate material, comprising, in combination:
   a container including a bottom for storing said materal;
   a pluraity of outlet ports defined in said bottom for the discharge of said material;
   receiving means disposed below each of said outlet ports and operable for receiving and accumulating a sufficient amount of the discharged material to block controllably the continued discharge of said material from said outlet ports;
   fluid expulsion means associated with each of said receiving means and being controllably operable to eject a fluid under pressure into the accumulating material for restraining the accumulation of said material on said receiving means and
   movable support means connected to said receiving means, whereby the position of said receiving means with respect to said outlet ports can be adjusted within a predetermined range of settings.

2. The device as claimed in claim 1, further comprising an outlet pipe for each of said outlet ports.

3. The device as claimed in claim 1, wherein said receiving means includes a plate having a surface area larger than the area of the associated outlet port.

4. The device as claimed in claim 1, further comprising a fluid reduction valve, a supply conduit for said fluid connected to said reduction valve, and distribution conduits connecting said supply conduit and each of said fluid expulsion means, whereby said fluid can be supplied to said reduction valve by the operation of said fluid expulsion means.

5. The device as claimed in claim 4, further comprising a control valve connected in said supply conduit behind said reduction valve with respect to the direction of flow of said fluid and operable to be changed between two states for opening or closing said supply conduit to said fluid, and control means coupled to said control valve and operable for changing the state of said control valve.

6. The device as claimed in claim 1, further comprising a supply conduit connected to said container for supplying another fluid to be interacted with said material in order to clean said other fluid.

7. A device for controlling the discharging of particulate material, comprising, in combination:
   a container including a bottom for storing said material;
   a plurality of outlet ports defined in said bottom for the discharge of said material;
   receiving means disposed below each of said outlet ports and operable for receiving and accumulating a sufficient amount of the discharged material to block controllably the continued discharge of said material from said outlet ports; and
   fluid expulsion means associated with each of said receiving means, including a nozzle, and being controllably operable to eject a fluid under pressure into the accumulating material thereby restraining the accumulation of said material on said receiving means wherein each of said receiving means includes a disc-like plate with the nozzle of said fluid means arranged in the middle of said plate for directing the ejected fluid across the upper surface of said plate.

* * * * *